(12) United States Patent
Kapadia et al.

(10) Patent No.: US 9,438,475 B1
(45) Date of Patent: Sep. 6, 2016

(54) SUPPORTING RELAY FUNCTIONALITY WITH A DISTRIBUTED LAYER 3 GATEWAY

(71) Applicant: Cisco Technology, Inc., San Jose, CA (US)

(72) Inventors: Shyam Kapadia, Santa Clara, CA (US); Nilesh Shah, Fremont, CA (US); Sharanya Subramanian, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 226 days.

(21) Appl. No.: 14/231,901

(22) Filed: Apr. 1, 2014

(51) Int. Cl.
*H04L 12/66* (2006.01)
*H04L 12/24* (2006.01)

(52) U.S. Cl.
CPC .................... *H04L 41/0816* (2013.01)

(58) Field of Classification Search
CPC .................................................. H04L 45/745
USPC ........ 709/221, 222, 219, 217; 370/353, 254, 370/252
See application file for complete search history.

(56) References Cited

U.S. PATENT DOCUMENTS

| 8,224,337 B2 * | 7/2012 | Gosnell ............... H04L 12/6418 370/352 |
| 8,635,314 B2 | 1/2014 | Droms et al. |
| 2007/0280207 A1 * | 12/2007 | Shimizu .............. H04L 29/1233 370/353 |

OTHER PUBLICATIONS

"Defining a Subnetwork in ADS"—UCSB, Jan. 2003 http://www.ece.ucsb.edu/Faculty/rodwell/Classes/ece218b/tutorials_etc/ADS_subnetworks_103.pdf.*

* cited by examiner

*Primary Examiner* — Randy Scott
(74) *Attorney, Agent, or Firm* — Edell, Shapiro & Finnan, LLC

(57) ABSTRACT

Techniques described herein provide enhanced address allocation services in a network. A switch device in communication with a host device is configured as an address relay device and receives an address request message from the host device. The switch device modifies the address request message to include a response address that uniquely identifies the switch device. The switch device adds in a field of the address request message subnetwork information that identifies a subnetwork to which the host device belongs. The switch device sends the modified address request message to an address server.

22 Claims, 6 Drawing Sheets

DHCP Network Tree

Select VPN: vpn_Cust7.Part1

| Name | | Expand All |
|---|---|---|
| Collapse All | | |
| 192.168.30.0/24 — 302 | | |
| vpn_Cust7.Part1_prim_scope | | |
| 10.10.10.0/24 — 304(1) | | |
| 98503 — 306(1) | | |
| 20.20.20.0/24 — 304(2) | | |
| 98504 — 306(2) | | |
| 30.30.30.0/24 — 304(3) | | |
| 98501 — 306(3) | | |
| ⇧ ⇧ ⇩ ⇩  🔍 [Network Addr/Mask] | | |

SUPPORTING RELAY FUNCTIONALITY WITH A DISTRIBUTED LAYER 3 GATEWAY

TECHNICAL FIELD

The present disclosure relates to optimizing address assignments in a network.

BACKGROUND

Physical servers in a network may be located in a rack unit that houses a plurality of servers. The physical servers may connect to a top of rack (ToR) switch that routes communications between the servers as well as to other external network elements. The ToR switch may be connected to other ToR switches in the network. The physical servers in a rack unit may be configured to host one or more virtual machines that are arranged in one or more virtual networks or subnets. Upon joining the network, the physical server and the virtual machines hosted by the physical servers are assigned context identifiers, such as an Internet Protocol (IP) address and subnet information.

BRIEF DESCRIPTION OF THE DRAWINGS

FIG. 3 shows an example address configuration database maintained by the address server to allocate addresses to the one or more host devices, according to an example embodiment.

DESCRIPTION OF EXAMPLE EMBODIMENTS

Overview

The techniques described herein provide enhanced address allocation services in a network. A switch device in communication with a host device is configured as an address relay device and receives an address request message from the host device. The switch device modifies the address request message to include a response address that uniquely identifies the switch device. The switch device adds in a field of the address request message subnetwork information that identifies a subnetwork to which the host device belongs. The switch device sends the modified address request message to an address server.

Example Embodiments

Figure 1:
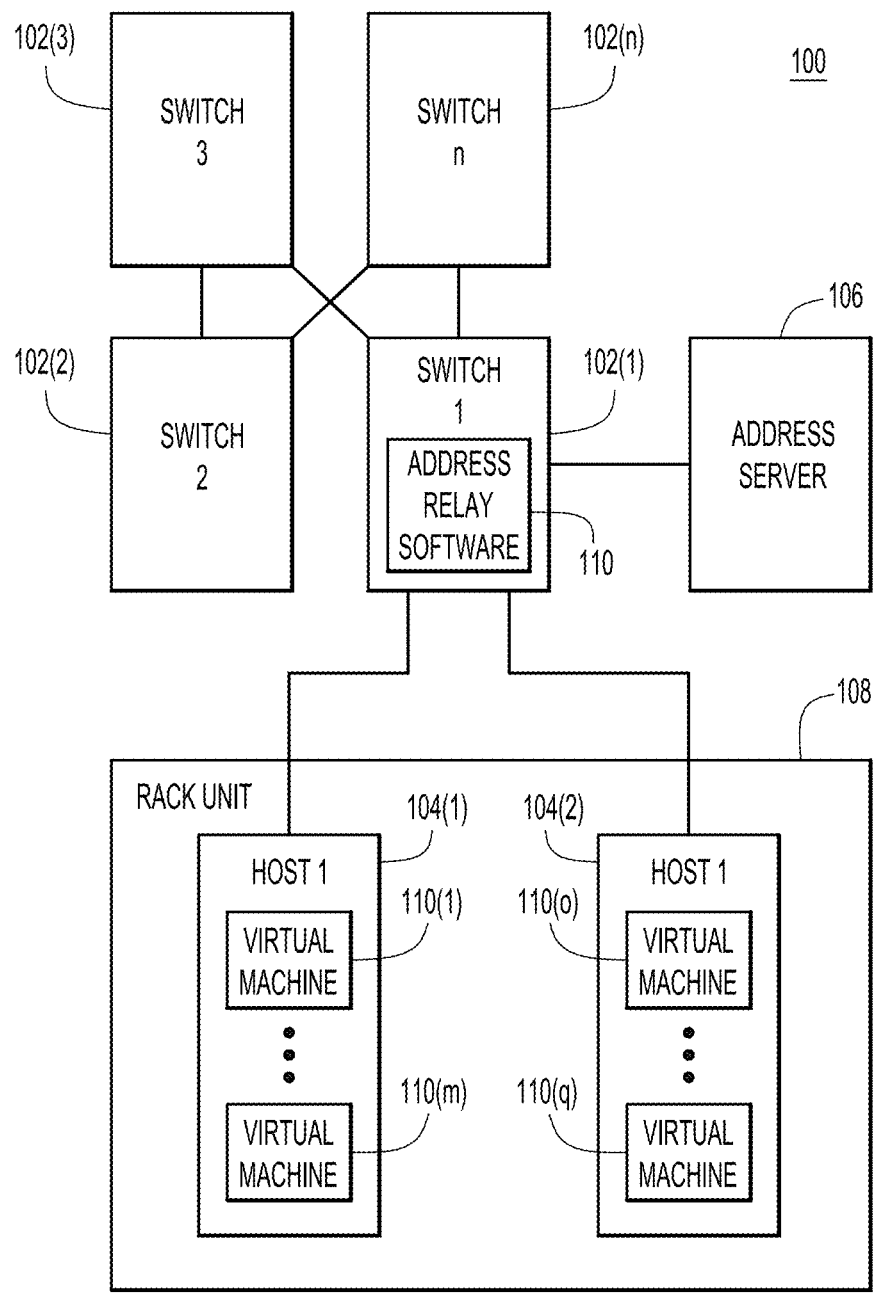
FIG. 1 shows an example system or network topology including a plurality of switches configured to provide enhanced address allocation services to one or more host devices, according to an example embodiment.

The techniques presented herein involve providing enhanced address allocation services in a network. An example network system/topology (hereinafter "network") is shown at reference numeral 100 in FIG. 1. The network 100 has a plurality of switch devices (also referred to hereinafter as "switches") shown at reference numerals 102(1)-102(n). Switch 102(1) may be referred to hereinafter as "switch 1," switch 102(2) may be referred to hereinafter as "switch 2," and so on. The network 100 also has a plurality of host devices. FIG. 1 shows two host devices 104(1) and 104(2), though it should be appreciated that the network 100 may have any number of host devices. Host device 104(1) may be referred to hereinafter as "host 1" and host device 104(2) may be referred to hereinafter as "host 2." Additionally, the network 100 has an address server 106.

The switches 102(1)-102(n) are network devices that are configured to route communications originating from and destined for one or more host devices. For example, the switches 102(1)-102(n) may be used to route communications originating from and destined for host devices in a particular rack unit managed by the respective switches 102(1)-102(n). FIG. 1 shows rack unit 108, which houses host 1 and host 2. In FIG. 1, communications (e.g., packets, including data messages, address request messages, address response messages, etc.) originating from and/or destined for host 1 and host 2 are managed by switch 1. Thus, switch 1 may also be referred to as a Top-of-Rack switch ("ToR switch"), since it manages communications of host devices within a particular rack unit. It should be appreciated that the other switch devices (e.g., switch 2, switch 3 and switch n) may also be ToR switches for other respective rack units.

The switches 102(1)-102(n) are configured to exchange communications with each other. For example, as shown in FIG. 1, each switch is connected to every other switch in the network 100. Thus, the switches 102(1)-102(n) shown in FIG. 1 are said to be "fully-meshed," for example, in a spine-leaf topology. It should be appreciated, however, that the enhanced address allocation services described herein are not limited to spine-leaf topologies and that these techniques may be applicable to any network topology (e.g., fully meshed networks with any-to-any connectivity). Each of the switches 102(1)-102(n) may support functionality as defined by the Open Systems Interconnection (OSI) model layer 2 and/or layer 3. For example, each of the switches may perform layer 2 address look-up operations (e.g., Media Access Control (MAC) address look-up operations) and/or may perform layer 3 address look-up operations (e.g., Internet Protocol (IP) address look-up operations). It should be understood that the switches 102(1)-102(n) have switching and routing capabilities.

The host devices 104(1) and 104(2) in the network 100 are physical servers ("servers") housed in the rack unit 108. It should be appreciated that the term "host device" and "physical server" are used interchangeably herein. The host devices are physical devices that are configured to exchange data communications (e.g., packets) with each other in the network 100 via one or more of the switches 102(1)-102(n). Each of the host devices may be configured to host one or more "virtual" machines ("VMs"). For example, in FIG. 1, host 1 is configured to host VM 110(1)-110(m), while host 2 is configured to host VM 110(o)-110(q). The virtual machines are also configured to exchange communications with each other (and with other virtual machines not shown in FIG. 1) via the switches 102(1)-102(n). Though not shown in FIG. 1, the host devices 104(1) and 104(2) are also configured to host one or more virtual switches, and the virtual machines of respective host devices may connect to the ToR switches via a virtual switch.

The host devices 104(1) and 104(2) may be arranged in a Local Area Network (LAN). Likewise, the virtual machines hosted by the host devices may be arranged in layer 2 Virtual Local Area Networks (VLANs). Additionally, the host devices 104(1) and 104(2) and the virtual machines may also be arranged in layer 3 subnetworks ("subnets"). In one example, multiple layer 3 subnets of virtual machines may exist in the same broadcast layer 2 LAN or VLAN.

The address server 106 is a network device that is configured to assign addresses to other devices in the network 100. For example, the address server 106 may be a Dynamic Host Control Protocol (DHCP) server that is configured to store a plurality of layer 3 addresses (e.g., IP addresses). The address server 106 is configured to assign layer 3 addresses to devices (e.g., host 1, host 2 and/or virtual machines hosted by host 1 and host 2) in the network 100 as the devices are instantiated/join the network 100. For example, as a host device joins the network 100, the host device may request an IP address from a DHCP server. Upon receiving the request, the DHCP server will assign the host device an appropriate IP address. Likewise, as virtual machines are instantiated/join the network 100, the virtual machines may request layer 3 address from the address server 106. For example, as a virtual machine joins the network 100, the virtual machine may request an IP address from the DHCP server, and, in response, the DHCP server may provide the virtual machine with an appropriate IP address associated with the subnet to which the virtual machine belongs.

In FIG. 1, the address server 106 is shown as being in communication with switch 1. Thus, switch 1 is configured to operate as an "address relay device," which is one of many features that switch 1 may support. When switch 1 operates as a typical address relay device, switch 1 may receive an address request message from a host device (originating, e.g., from a virtual machine), and switch 1 may relay the address request message to the address server 106. Likewise, upon assigning the virtual machine with the appropriate layer 3 address, the address server 106 will send the address assignment information to switch 1. Switch 1 will then relay the address information to host 1 such that the virtual machine hosted by host 1 can receive the address information and can begin layer 3 communications in the network 100. Though FIG. 1 shows the address server 106 in communication only with switch 1, it should be appreciated that all of the switches 102(1)-102(n) are in communication with the address server 106.

As virtual machines join the network 100, the virtual machines are hosted by particular host devices. For example, in FIG. 1, virtual machines 110(1)-110(m) are hosted by host 1, and virtual machines 110(o)-110(q) are hosted by host 2. The virtual machines, however, may change host devices. For example, FIG. 1 shows a static-state, where virtual machine 110(1) is hosted by host 1, but virtual machine 110(1) may later migrate or "move" to host 2. Likewise, virtual machine 110(o), shown in FIG. 1 as hosted by host 2, may later migrate or "move" to host 1. In other examples, virtual machines may deactivate or drop from the network 100, and new additional virtual machines may join the network 100. Thus, it is important that the network 100 support virtual machine mobility (also referred to as "virtual machine motion" or "VM motion").

As virtual machines move from host 1 to host 2, and vice versa, virtual machines provisioned in different subnets may move between host 1 and host 2, and thus, switch 1 (which manages host 1 and host 2, and thus communications of virtual machines hosted by host 1 and host 2) needs to be provisioned to handle communications for every VLAN and subnet in the network 100. For example, switch 2 may manage host devices that host virtual machines residing in VLANs and subnets different from the virtual machines hosted by host 1 and host 2. Thus, switch 1 needs to be provisioned to handle communications for these additional VLANs and subnets, since the virtual machines associated with switch 2 might later migrate to host devices managed by switch 1. Likewise, all of the other switches in the network 100 also need to be provisioned to handle communications for every VLAN and subnet in the network 100. If the switches 102(1)-102(n) are not provisioned to handle every VLAN and subnet, Address Resolution Protocol (ARP) messages and Neighbor Discover (ND) messages will be flooded in the network 100 as VM motion occurs. This flooding consumes significant network resources.

As a result, each of the switches 102(1)-102(n) is provisioned with logic (e.g., software) that enables the switches to operate as "distributed layer 3" gateway devices. That is, as "distributed layer 3" gateway devices, the switches 102(1)-102(n) are configured to handle communications originating from and destined for devices in any VLAN (e.g., layer 2 communications) or subnet (e.g., layer 3 communications). For example, current techniques involve configuring each of the switches 102(1)-102(n) with a same distributed layer 3 gateway layer 3 (e.g., IP) address such that IP traffic originating from and/or destined for host devices and virtual machines will be routed between and within subnets without flooding across the network 100. Typically, in existing implementations, end hosts are configured with a default gateway IP address that is the IP address of a layer 3 interface of a switch device. Thus, in order to route traffic (e.g., forward traffic to subnets/VLANs) packets first need to be sent to the default gateway from where they will be routed into the destination subnet. This causes unnecessary hair-pinning of traffic to a switch, where the IP address corresponding to the default gateway is configured. With a distributed gateway, the same IP address corresponding to the default gateway can be concurrently configured on any and all switches. In this way, any routed traffic can be forwarded directly from any switch without hair-pinning of the traffic. In addition, ARPs are typically terminated where the default gateway resides. If the default gateway resides everywhere, then every switch only needs to process the ARPs corresponding to the hosts that are directly below the switch. These ARPs do not need to be flooded across the fabric, and instead, the host routes that are learned via ARP are communicated across the fabric to other switches using some routing protocol or some other central controller.

However, when the distributed layer 3 gateway layer 3 address (e.g., the distributed layer 3 gateway IP address) is provisioned on all of the switches 102(1)-102(n), the address relay functionality of the switches with respect to the address server 106 is disrupted. That is, since all of the switches 102(1)-102(n) have the same distributed layer 3 gateway IP address, in current implementations it is difficult, if not impossible, for the address server 106 to reply to an address request message relayed by one of the switches 102(1)-102(n).

DHCP typically involves a four-way handshake. First, an end host will send a DHCP discover message to a DHCP server. The DHCP server then will send a DHCP offer message to the end host. Upon receiving the DHCP offer message, the end host (e.g., host 1) will send a DHCP request message (e.g., originating from a virtual machine hosted by host 1) that is destined for the address server 106 (e.g., DHCP server). Switch 1, residing in a network path between host 1 and the DHCP server will intercept the DHCP request message and will encapsulate the DHCP request message in a payload of an IP packet. This IP packet is referred to as a "request IP packet". The request IP packet header will list the IP address of switch 1 as the source address and will list the IP address of the DHCP server as the destination address. In one example, the IP address of switch 1 in the payload of the request IP packet is referred to as a "giAddr" field. The giAddr field is also referred to as a "relay agent address field." Switch 1 will then send the request IP packet to the DHCP server. The DHCP server will analyze the payload of the request IP packet (including the DHCP request sent by host 1) and will allocate an appropriate IP address (e.g., in the appropriate subnet in which the virtual machine originating the DHCP request message belongs). The DHCP server then completes the fourth part of the four-way handshake by sending a DHCP acknowledgment message (e.g., a response message) to the same IP address that was present in the header of the request IP packet. In other words, the DHCP server sends the DHCP response to the IP address in the giAddr field of the request IP packet.

However, as stated above, switches 102(1)-102(n) may be provisioned with the same distributed layer 3 gateway IP address. Consequently, the giAddr field of the request IP packet may identify all of the switches 104(1)-104(n) in the network 100 instead of particularly identifying switch 1. Thus, the DHCP server cannot use the giAddr field to identify the particular switch device to return the DHCP response. As a result, using the distributed layer 3 gateway IP address causes a response message problem at the DHCP server. Using the distributed layer 3 gateway IP address causes an additional problem. Ordinarily, the DHCP server will analyze the giAddr field to determine an appropriate subnet from which the next available layer 3 address is to be returned. When the giAddr field has the distributed layer 3 gateway IP address, the DHCP server cannot use the giAddr field to select the appropriate subnet scope from which the next available DHCP address is to be returned, since the giAddr field indicates an address that identifies all of the subnets in the network 100. In other words, using the distributed layer 3 gateway IP address in the giAddr field causes a subnet identification problem at the DHCP server.

Thus, it is desirable to enable the DHCP server to perform address allocation to devices in the network 100 while still maintaining the distributed layer 3 gateway IP addresses at the switches 102(1)-102(n). The techniques described herein provide such solutions. In particular, the techniques described herein enable the switches 102(1)-102(n) to maintain address relay functionality while still provisioned as layer 3 distributed layer 3 gateway devices. The address relay software 112 in FIG. 1 represents, generally, processes for accomplishing these enhanced address allocation services.

Figure 2:
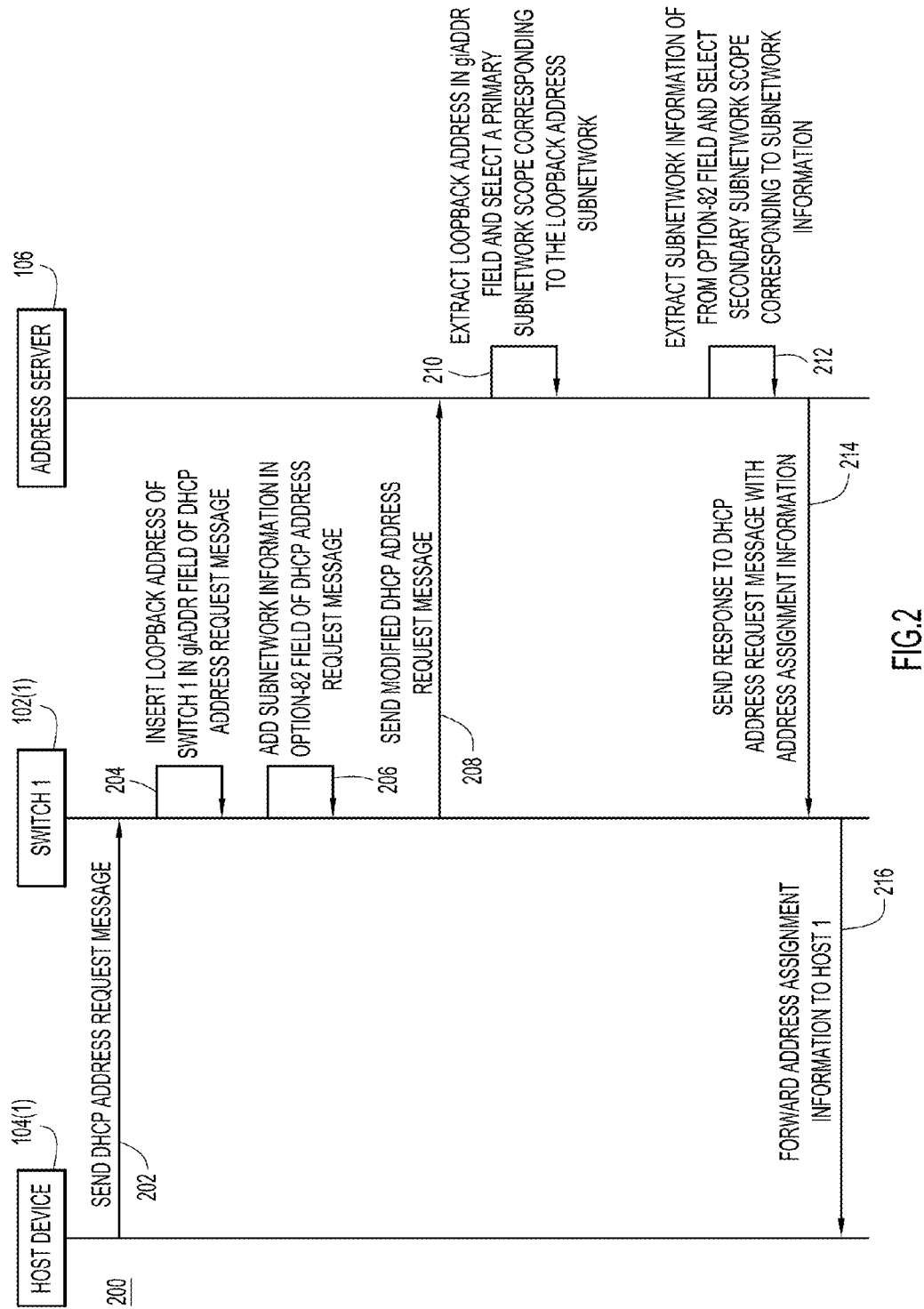
FIG. 2 shows an example ladder diagram depicting exchanges between a host device, the switch and an address server to provide the enhanced address allocation services, according to an example embodiment.

Reference is now made to FIG. 2. FIG. 2 shows an example ladder diagram 200 depicting exchanges between devices in the network 100 to provide the enhanced address allocation services. FIG. 2 is described with continued reference to elements in FIG. 1. At reference numeral 202, host device 104(1) (host 1) broadcasts a DHCP address request message, which is received by switch 102(1) (switch 1). In one example, the DHCP address request message is generated by a virtual machine hosted by host 1 and is broadcast with the intent that either a DHCP server or an address relay device will receive the DHCP address request message. In this example, switch 1 intercepts ("traps") the DHCP address request message. At 204, switch 1 inserts a loopback address of switch 1 in the giAddr field of the DHCP address request message. Switch 1 includes the DHCP address request message with the giAddr field in a payload of an IP packet (request IP packet), and the source address of the request IP packet is the address in the giAddr field (i.e., the loopback address of switch 1). In general, the loopback address of switch 1 refers to an address used by switch 1 over which routing protocols and route distribution occurs. For example, the internal Border Gateway Protocol (iBGP) may be used to distribute host routes from switch 1 to the other switches 102(2)-102(n) in the network 100, and as such, switch 1 has a unique loopback address over which iBGP sessions are established. The information of the loopback address includes IP address to MAC address binding information. The IP-MAC address binding information is exchanged over layer 2 Intermediate System-to-Intermediate System (IS-IS) topologies. Additionally, the information in the loopback address contains subnet information identifying a subnet to which a switch belongs.

Thus, the loopback address contains a unique IP address that identifies switch 1. After switch 1 inserts the loopback address of switch 1 in the giAddr field of the DHCP address request message, switch 1, at 206, adds subnet information of host 1 (e.g., the subnet of the virtual machine that originally generated the DHCP address request message) in the DHCP address request message. For example, the DHCP address request message may contain an option field (e.g., an "option-82" field) that is a vendor specific option. The DHCP server is configured to extract the vendor specific option to obtain the subnet information. At 208, switch 1 sends to the address server 106 the modified DHCP address request message, with the giAddr field as the loopback address and with the subnet information of the virtual machine requesting the address in the option-82 field. In one example, the modified DHCP address request message is an IP packet with a header that includes a source address that is the same as the loopback address of switch and a destination address that is the IP address of the address server 106.

After receiving the modified DHCP request message, the address server (e.g., a DHCP server), at 210, extracts the loopback address in the giAddr field. The loopback address uniquely identifies the switch that sent the DHCP request message (i.e., switch 1). The address server 106 also selects a primary subnet scope corresponding to the loopback address subnet. For example, as stated above, the loopback address may contain subnet information associated with switch 1, and as a result, the address server 106 may select a primary subnet from which the IP address is ultimately to be retrieved by the address server 106. At 212, the address server 106 extracts the subnet information of the virtual machine that originated the DHCP address request message from the option-82 field. The address server 106 uses the subnet information in the option-82 field to determine a secondary subnet from which the IP address is ultimately to be retrieved. Thus, the address server 106 selects the appropriate IP address to be assigned to the virtual machine hosted by host 1, first by identifying a primary subnet of switch 1 (by extracting the loopback address in the giAddr field), and second by identifying a secondary subnet (e.g., within the primary subnet) by extracting the subnet information in the option-82 field. At 214, the address server 106 sends a response to the DHCP request message to switch 1. The response to the DHCP request message is also referred to as a "DHCP response message." The DHCP response message is sent to the same IP address in the giAddr field (i.e., the loopback address that uniquely identifies switch 1). In other words, by modifying the original DHCP request message to insert the loopback address in the giAddr field, switch 1 causes the address server to send to switch 1 a DHCP response message. The DHCP response message comprises the address assignment information (e.g., the layer 3 IP address assigned for the virtual machine hosted by host 1). At 216, switch 1 sends the address assignment information to host 1. Thus, when host 1 receives the address assignment information, the virtual machine that sent the original DHCP address request message is provisioned with an IP address. As a result, after being provisioned with the IP address, the virtual machine is able to send and receive layer 3 communications in the network 100.

Reference is now made to FIG. 3, which shows an example address database 300 maintained by the address server 106. As stated above in connection with FIG. 2, the address server 106 identifies a primary subnet based on the loopback information it extracts from the giAddr field of the modified DHCP request message. The primary subnet is associated with the subnet of switch 1, and is shown at entry 302 in FIG. 3. The primary subnet 302 has three secondary subnet entries, shown at 304(1)-304(3). Each secondary subnet is shown with an IP address, though it should be appreciated that multiple IP addresses may be present in each secondary subnet. The IP address for secondary subnet 304(1) is shown at 306(1), the IP address for secondary subnet 304(2) is shown at 306(2) and the IP address for secondary subnet 304(3) is shown at 306(3). As described in connection with FIG. 2, above, the address server 106 identifies the secondary subnets 304(1)-304(3) by extracting the information in the option-82 field of the modified DHCP request message. The option-82 field is an option field that contains subnet information of the virtual machine originating the DHCP request message. Thus, the address server 106 is provisioned to determine a primary subnet (by evaluating the giAddr field of the modified DHCP request message) related to switch 1 and is also provisioned to determine a secondary subnet (by evaluating the option-82 of the modified DHCP request message) related to the virtual machine. Ultimately, the address server 106 selects an appropriate IP address to be assigned to the virtual machine that originates the DHCP request message.

Figure 4:
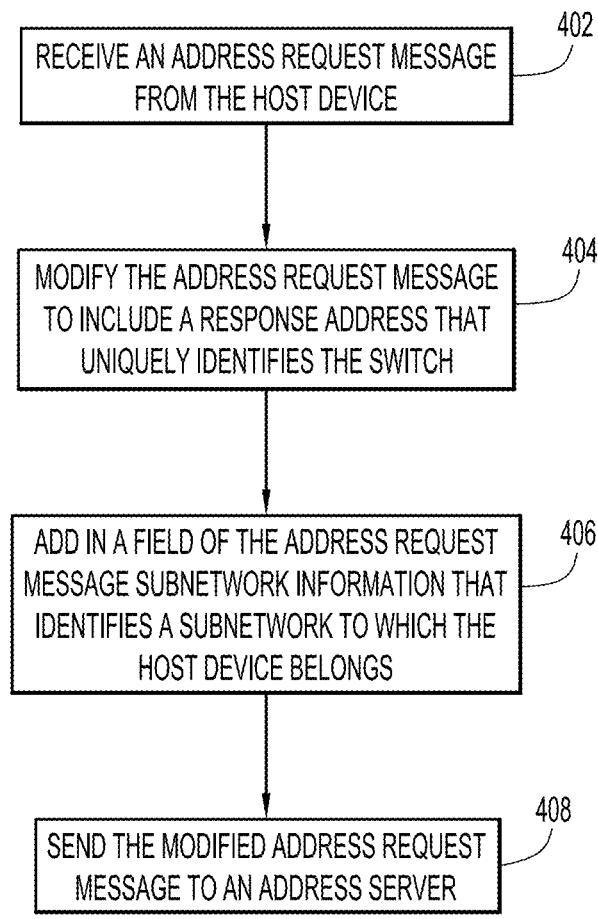
FIG. 4 shows an example flow chart depicting operations performed by the switch to provide the enhanced address allocation services, according to an example embodiment.

Reference is now made to FIG. 4. FIG. 4 shows an example flow chart 400 depicting operations performed by switch 1 to provide the enhanced address allocation services. It should be appreciated that the operations depicted in FIG. 4 may be performed by any of the switches 102(1)-102(n) in the network 100. At 402, switch 1 receives an address request message from host 1 (or any host device in the network managed by switch 1). Switch 1 modifies the address request message, at 404, to include a response address that uniquely identifies the switch device. This response address is, for example, the loopback address that uniquely identifies switch 1. The loopback address also contains, for example, subnetwork information identifying a subnetwork to which switch 1 belongs. At 406, switch 1 adds in a field of the address request message subnetwork information that identifies a subnetwork to which host 1 belongs. For example, the subnetwork information may comprise a VLAN identifier. At 408, switch 1 sends the modified address request message to the address server 106.

Figure 5:
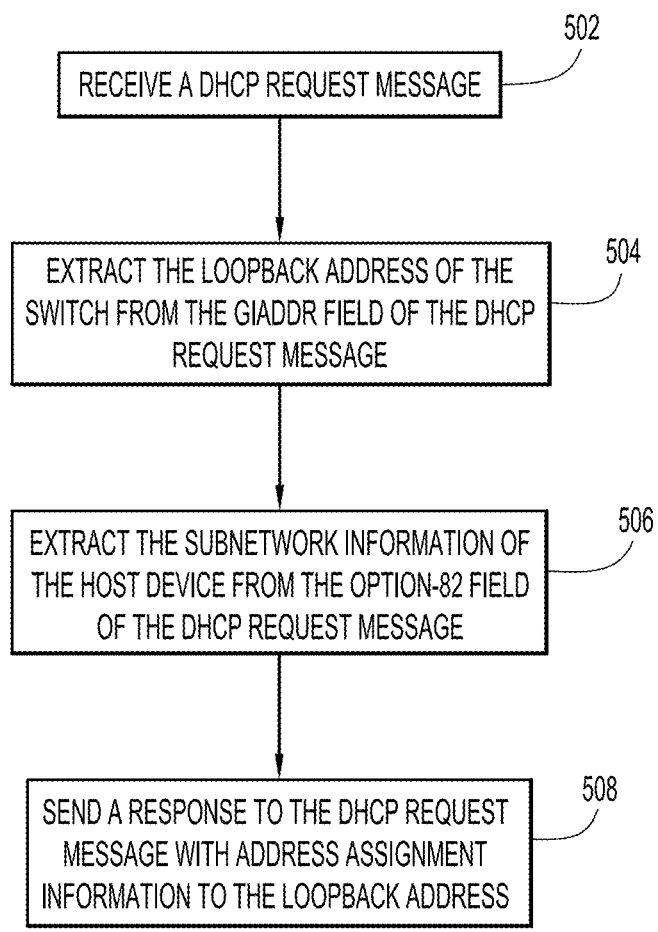
FIG. 5 shows an example flow chart depicting operations performed by the address server to assign the addresses to the one or more host devices, according to an example embodiment.

Reference is now made to FIG. 5. FIG. 5 shows an example flow chart 500 that depicts operations performed by the address server 106 to assign an address (e.g., a layer 3 address) to host 1. It should be appreciated that address server 106 may assign an address to host 1 or to a virtual machine hosted by host 1 (or any other host device in the network 100). At 502, the address server 106 (e.g., DHCP server) receives a DHCP request message (e.g., the modified DHCP request message from switch 1). The DHCP server, at 504, extracts the loopback address of switch 1 from the giAddr field of the DHCP request message. At 506, the DHCP server extracts the subnetwork information of host 1 from the option-82 field of the DHCP request message. The DHCP server sends a response to the DHCP request message with address assignment information (e.g., an IP address) to the loopback address.

Thus, by utilizing the loopback address in the giAddr field of the DHCP request message and by providing the subnet information in the option field, switch 1 is able to maintain its provisioning as an distributed layer 3 gateway device while also operating as an address relay device. Switch 1 operates as an address relay device without any additional configuration of the address server 106 and without any specialized address server functionality. This solution is backwards compatible in that if there are some traditional subnets that do not use distributed layer 3 distributed layer 3 gateway functionality on a switch, switches that do operate with the distributed layer 3 gateway functionality will coexist with these traditional switches. This solution may be deployed in any data center or network architecture/topology that uses distributed layer 3 distributed layer 3 gateways. It should be appreciated that the DHCP operations may include DHCP version 4 and DHCP version 6 protocols.

Figure 6:
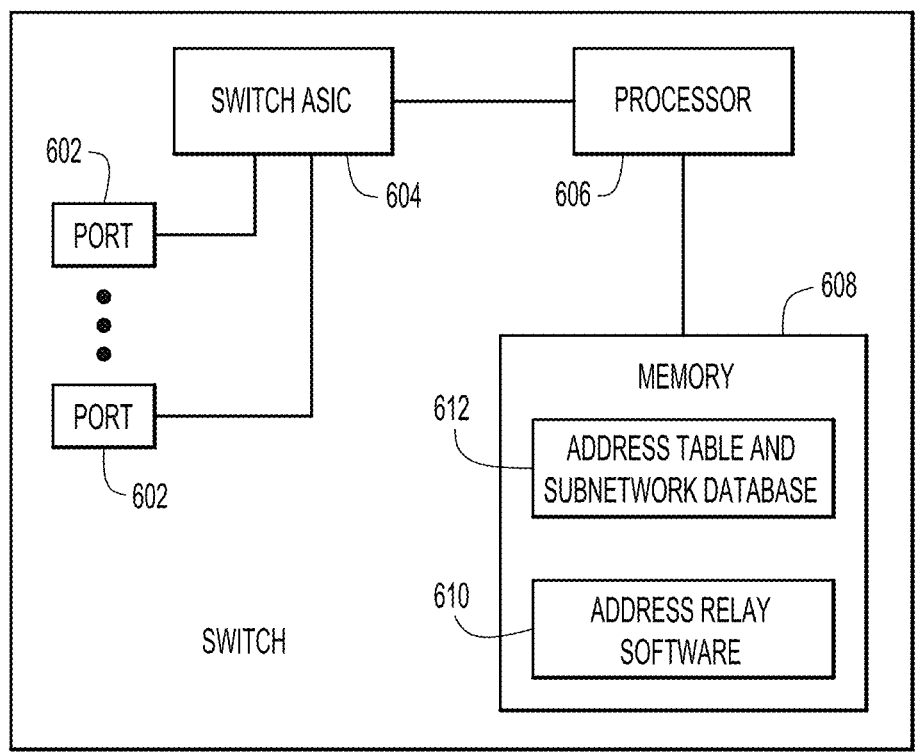
FIG. 6 shows an example block diagram of the switch configured to perform the enhanced address allocation services, according to an example embodiment.

Reference is now made to FIG. 6. FIG. 6 shows an example block diagram 102 of a switch configured to perform the enhanced address allocation services. It should be appreciated that the block diagram 102 may represent any of the switches 102(1)-102(n), and for simplicity, block diagram 102 refers to switch 102 generally. The switch comprise a plurality of ports 602, a switch Application Specific Integrated Circuit (ASIC) 604, a processor 606 and a memory 608. The ports 602 receive communications (e.g., packets) from network devices and are configured to send communications to and receive communications from network devices. The ports 602 are coupled to the switch ASIC 604. The switch ASIC 604 receives instructions from the processor 606 and forwards packets (received by the switch at one of the ports 602) to appropriate ports 602 for transmission to a destination network device. The switch ASIC 604 is coupled to the processor 606. The processor 606 is, for example, a microprocessor or microcontroller that is configured to execute program logic instructions (i.e., software) for carrying out various operations and tasks of the switch 102, as described above. For example, the processor 606 is configured to execute address relay software 610 according to the techniques described above. The address relay software 610 also instructs the processor to maintain and update an address table and subnetwork database 612 that maintains a list of addresses at the switch 102. As an alternative, the address table and subnetwork database 612 may be maintained by the switch ASIC 604. The functions of the processor 606 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 608 may comprise read only memory (ROM), random access memory (RAM), magnetic disk storage media devices, optical storage media devices, flash memory devices, electrical, optical, or other physical/tangible (non-transitory) memory storage devices. The memory 608 stores software instructions for the address relay software 610. The memory 608 also stores the address table and subnetwork database 612. Thus, in general, the memory 608 may comprise one or more computer readable storage media (e.g., a memory storage device) encoded with software comprising computer executable instructions and when the software is executed (e.g., by the processor 606) it is operable to perform the operations described for the address relay software 610.

The address relay software 610 may take any of a variety of forms, so as to be encoded in one or more tangible computer readable memory media or storage device for execution, such as fixed logic or programmable logic (e.g., software/computer instructions executed by a processor), and the processor 606 may be an ASIC that comprises fixed digital logic, or a combination thereof.

For example, the processor 606 may be embodied by digital logic gates in a fixed or programmable digital logic integrated circuit, which digital logic gates are configured to perform the address relay software 610. In general, the address relay software 610 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the switches 102(1)-102(n), host devices 104(1) and 104(2) and address server 106 may be performed by one or more computer or machine readable storage media (non-transitory) or device executed by a processor and comprising software, hardware or a combination of software and hardware to perform the techniques described herein. Moreover, the switch ASIC 604 may be configured to perform the operations described herein, instead of the processor 606.

In summary, a method is provided comprising: at a switch device in communication with a host device in a network and configured as an address relay device, receiving an address request message from the host device; modifying the address request message to include a response address that uniquely identifies the switch device; adding in a field of the address request message subnetwork information that identifies a subnetwork to which the host device belongs; and sending the modified address request message to an address server.

In addition, an apparatus is provided comprising: a plurality of ports configured to send and receive messages in a network; and a processor coupled to the ports, and configured to: obtain an address request message received from a host device in a network at one of the ports; modify the address request message to include a response address that uniquely identifies the apparatus; add in a field of the address request message subnetwork information that identifies a subnetwork to which the host device belongs; and cause the modified address request message to be sent to an address server.

Furthermore, one or more computer-readable storage media is provided that is encoded with software comprising computer executable instructions and when the software is executed operable to: obtain an address request message received from a host device in a network; modify the address request message to include a response address that uniquely identifies a switch device; add in a field of the address request message subnetwork information that identifies a subnetwork to which the host device belongs; and cause the modified address request message to be sent to an address server.

The above description is intended by way of example only. Various modifications and structural changes may be made therein without departing from the scope of the concepts described herein and within the scope and range of equivalents of the claims.

What is claimed is:

1. A method comprising:
    at a switch device in communication with a host device in a network and configured as an address relay device, receiving an address request message from the host device;
    modifying the address request message to include a response address that uniquely identifies the switch device;
    adding in a field of the address request message subnetwork information that identifies a subnetwork to which the host device belongs; and
    sending the modified address request message to an address server.

2. The method of claim 1, wherein the switch device is configured as a distributed layer 3 gateway device in the network.

3. The method of claim 1, wherein modifying comprises modifying the address request message to include a loopback address that uniquely identifies the switch device, wherein the loopback address is an address used by the switch device to distribute routing information to other switch devices in the network.

4. The method of claim 1, wherein receiving comprises receiving a Dynamic Host Control Protocol (DHCP) address request message from the host device.

5. The method of claim 4, wherein modifying comprises modifying a relay agent address field of the DHCP address request message to include the response address that uniquely identifies the switch device.

6. The method of claim 4, wherein adding comprises adding the subnetwork information to an option field of the DHCP address request message.

7. The method of claim 1, further comprising:
    receiving from the address server a response message comprising address assignment information for the host device; and
    sending the response message to the host device with the address assignment information.

8. The method of claim 1, wherein modifying comprises modifying the address request message to include the response address that uniquely identifies the switch device to cause the address server to send to the switch device a response message with address assignment information.

9. The method of claim 1, wherein the switch device is configured as a Dynamic Host Control Protocol (DHCP) relay server.

10. The method of claim 1, wherein receiving comprises receiving an address request message from the host device for an address assignment for a virtual machine managed by the host device.

11. An apparatus comprising:
    a plurality of ports configured in hardware to send and receive messages in a network; and
    a processor coupled to the ports, and configured to:
        obtain an address request message received from a host device in a network at one of the ports;

modify the address request message to include a response address that uniquely identifies the apparatus;
add in a field of the address request message subnetwork information that identifies a subnetwork to which the host device belongs; and
cause the modified address request message to be sent to an address server.

12. The apparatus of claim 11, wherein the processor is further configured to modify the address request message to include a loopback address that uniquely identifies the apparatus and that is an address used by the apparatus to distribute routing information to switch devices in the network.

13. The apparatus claim 11, wherein the processor is further configured to obtain from one of the ports a received Dynamic Host Control Protocol (DHCP) address request message.

14. The apparatus of claim 13, wherein the processor is further configured to modify a relay agent address field of the DHCP address request message to include the response address that uniquely identifies the apparatus.

15. The apparatus of claim 13, wherein the processor is further configured to add the subnetwork information to an option field of the DHCP address request message.

16. The apparatus of claim 11, wherein the processor comprises digital logic gates fixed in a programmable digital logic integrated circuit.

17. The apparatus of claim 16, wherein the programmable digital logic integrated circuit is an Application Specific Integrated Circuit ("ASIC").

18. A non-transitory computer-readable storage media encoded with software comprising computer executable instructions and when the software is executed operable to:
obtain an address request message received from a host device in a network;
modify the address request message to include a response address that uniquely identifies a switch device;
add in a field of the address request message subnetwork information that identifies a subnetwork to which the host device belongs; and
cause the modified address request message to be sent to an address server.

19. The computer-readable storage media of claim 18, wherein the instructions that are operable to modify comprise instructions that are operable to modify the address request message to include a loopback address that uniquely identifies the switch device and that is an address used by the switch device to distribute routing information to switch devices in the network.

20. The computer-readable storage media of claim 18, wherein the instructions operable to obtain comprise instructions operable to obtain a received Dynamic Host Control Protocol (DHCP) address request message.

21. The computer-readable storage media of claim 20, wherein the instructions operable to modify comprise instructions operable to modify a relay agent address field of the DHCP address request message to include the response address that uniquely identifies the switch device.

22. The computer-readable storage media of claim 20, wherein the instructions operable to add comprise instructions operable to add the subnetwork information to an option field of the DHCP address request message.

* * * * *